US012197301B2

(12) United States Patent
Schoen

(10) Patent No.: US 12,197,301 B2
(45) Date of Patent: Jan. 14, 2025

(54) SINGLE SIGN-ON VERIFICATION PLATFORM AND DECISION MATRIX

(71) Applicant: VeriFast Inc., Belleville (CA)

(72) Inventor: Craig Schoen, North Bay (CA)

(73) Assignee: VeriFast Inc., Belleville (CA)

( * ) Notice: Subject to any disclaimer, the term of this patent is extended or adjusted under 35 U.S.C. 154(b) by 0 days.

(21) Appl. No.: 17/858,848

(22) Filed: Jul. 6, 2022

(65) Prior Publication Data

US 2024/0012725 A1    Jan. 11, 2024

(51) Int. Cl.
| | |
|---|---|
| G06F 11/20 | (2006.01) |
| G06F 11/07 | (2006.01) |
| G06F 11/34 | (2006.01) |
| G06Q 20/10 | (2012.01) |
| G06Q 20/40 | (2012.01) |
| H04L 9/40 | (2022.01) |

(52) U.S. Cl.
CPC ...... *G06F 11/2025* (2013.01); *G06F 11/0709* (2013.01); *G06F 11/0793* (2013.01); *G06F 11/2028* (2013.01); *G06F 11/3447* (2013.01); *G06F 11/3452* (2013.01); *G06Q 20/108* (2013.01); *G06Q 20/401* (2013.01); *H04L 63/0815* (2013.01)

(58) Field of Classification Search
CPC ............. G06F 11/2025; G06F 11/0709; G06F 11/0793; G06F 11/2028; G06F 11/3447; G06F 11/3452; G06Q 20/108; G06Q 20/401; H04L 63/0815
See application file for complete search history.

(56) References Cited

U.S. PATENT DOCUMENTS

| | | | |
|---|---|---|---|
| 7,958,385 B1* | 6/2011 | Frangioso | ........... G06F 11/2025 709/224 |
| 2010/0223192 A1 | 9/2010 | Levine et al. | |
| 2015/0143162 A1* | 5/2015 | Wang | .................. G06F 11/2025 714/4.11 |
| 2015/0249512 A1* | 9/2015 | Adimatyam | ....... H04N 21/6131 725/107 |
| 2016/0086263 A1 | 3/2016 | Weinflash et al. | |
| 2018/0204280 A1 | 7/2018 | Painter et al. | |

(Continued)

OTHER PUBLICATIONS

Open banking—Wikipedia printed Aug. 2024 (Year: 2024).*

(Continued)

*Primary Examiner* — Bryce P Bonzo
*Assistant Examiner* — Michael Xu
(74) *Attorney, Agent, or Firm* — Lee & Hayes, P.C.

(57) ABSTRACT

An example method includes receiving an application, sending a prompt to an applicant to authorize access to financial information by an open banking system, and receiving the financial information associated with the applicant, the financial information including at least income information associated with the applicant. The method also includes determining an income score associated with the applicant based at least in part on the financial information, determining a threshold income score, and determining that the income score is equal to or greater than the threshold income score. The method further includes sending, to a reviewer, a recommendation to approve the application based at least in part on determining that the income score is equal to or greater than the threshold income score.

20 Claims, 6 Drawing Sheets

(56) References Cited

U.S. PATENT DOCUMENTS

| | | |
|---|---|---|
| 2018/0204281 A1 | 7/2018 | Painter |
| 2019/0068608 A1 | 2/2019 | Boland |
| 2019/0281014 A1* | 9/2019 | Lin ................... G06F 11/2023 |
| 2019/0317869 A1* | 10/2019 | Selvaraj ............... G06F 11/203 |
| 2020/0092404 A1* | 3/2020 | Wagmann ............. H04L 69/40 |
| 2020/0294095 A1 | 9/2020 | Buerger |
| 2020/0389317 A1* | 12/2020 | Dunjic ...................... H04L 9/30 |
| 2021/0011797 A1* | 1/2021 | Robison .............. G06F 11/0793 |
| 2021/0036854 A1* | 2/2021 | Dunjic ................. H04L 9/3213 |
| 2021/0182132 A1* | 6/2021 | Chen .................. G06F 11/0736 |
| 2022/0028012 A1 | 1/2022 | Hockey et al. |
| 2022/0284421 A1* | 9/2022 | Upadhye ............. G06Q 20/352 |
| 2023/0273868 A1* | 8/2023 | Shay ..................... G06F 11/302 |
| | | 714/41 |
| 2024/0012725 A1 | 1/2024 | Schoen |
| 2024/0013217 A1 | 1/2024 | Schoen |
| 2024/0013319 A1 | 1/2024 | Schoen |

OTHER PUBLICATIONS

Office Action for U.S. Appl. No. 17/858,838, mailed on Mar. 27, 2024, Schoen, "Single Sign-On Verification Platform and Decision Matrix", 16 Pages.

Office Action for U.S. Appl. No. 17/858,858, mailed on May 22, 2024, Schoen, "Single Sign-On Verification Platform and Decision Matrix", 28 Pages.

* cited by examiner

SINGLE SIGN-ON VERIFICATION PLATFORM AND DECISION MATRIX

BACKGROUND

When an applicant applies for a lease agreement, a loan, or other type of contractual agreement, the applicant is typically required to provide documentation verifying various items of information. Gathering and providing the required documentation can be a burdensome task for the applicant, especially in instances where the applicant desires to submit multiple applications to different entities. At the same time, reviewers of such applications may need to review copious amounts of information from various documents and sources to make an informed decision regarding an application. However, reviewers may be unable to verify whether the information provided by the applicant is valid, up to date, or otherwise accurately reflects information associated with the applicant.

Conventional application services often require applicants to gather and provide appropriate physical or electronic documentation and are unable to verify such information as being authentic and ensuring such documentation is not altered or fabricated. Furthermore, such conventional services typically rely on manual review of an application by a reviewer which may require hours of formatting, description form an applicant associated with various documents or contents thereof, calculations, and analysis.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
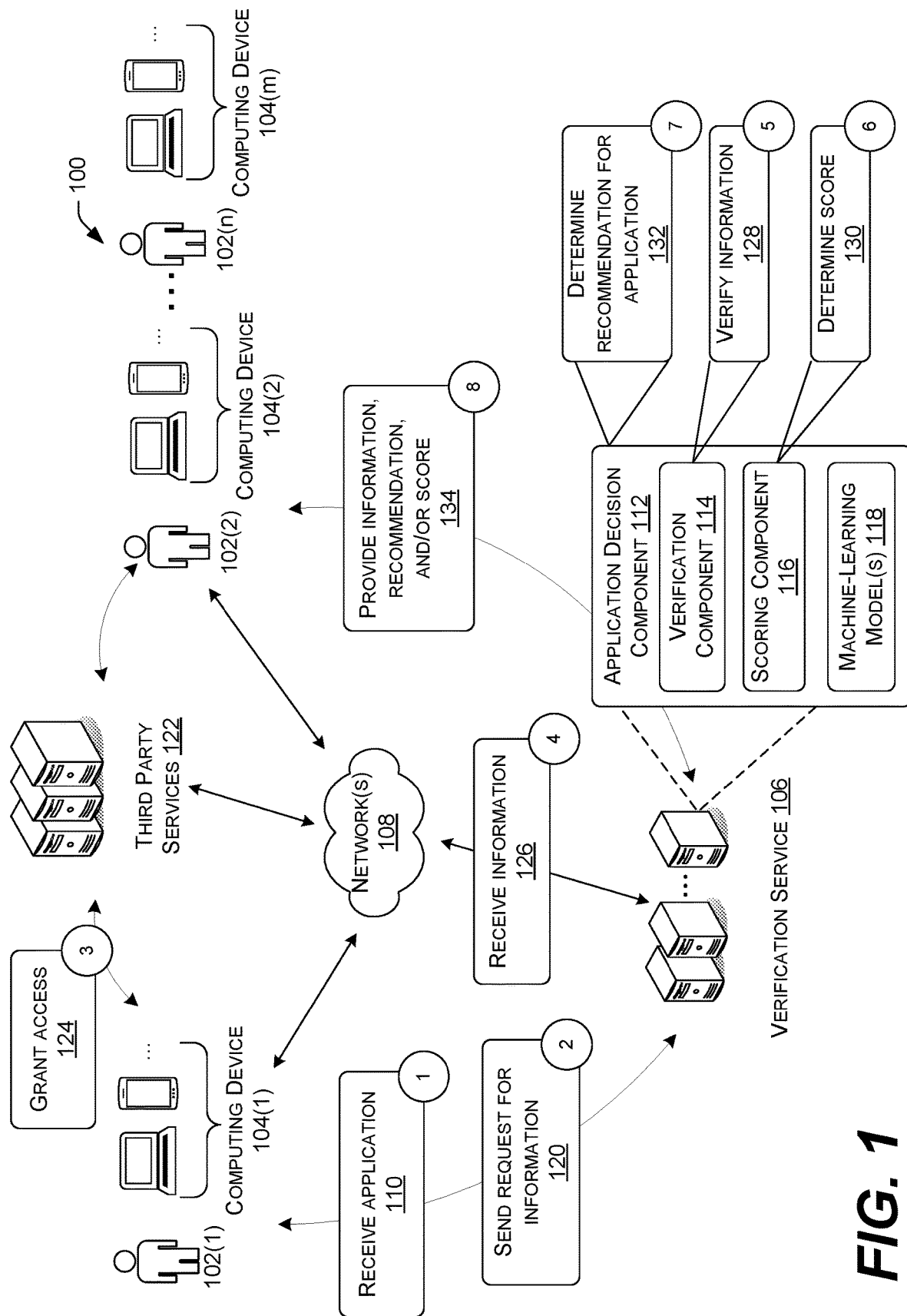
FIG. 1 is a schematic view of an example system usable to verify user information and provide a decision matrix for an application, in accordance with an example of the present disclosure.

As discussed above, when an applicant applies for a lease agreement (such as for a rental property, vehicle, or other lease agreement), a loan (such as for a mortgage, vehicle, or other loan), or other type of contractual agreement, the applicant is typically required to gather and provide documentation to be submitted along with an application. Gathering and providing such documentation can be a burdensome task for the applicant. For example, the applicant may be required to retrieve information from various entities and to gather documentation related to income, expenses, credit, debt, employment, education, identification, background, or other information associated with the applicant. Retrieving and providing such documentation may be especially burdensome in instances where an applicant desires to submit multiple applications to various separate entities that may desire different types of information or various formats for the information. Furthermore, in some examples, the applicant may be required to provide credit information (such as a credit score) to be submitted with the application. However, requesting multiple credit scores may negatively impact a credit score associated with the applicant.

Conventional systems allow an applicant to upload such information and documentation to be submitted along with an application. However, in typical examples, individual entities may include a dedicated system associated with the entity requiring the applicant to set up an account with each entity and to upload the information and documentation for each dedicated system associated with an application that the applicant submits with the entity.

Furthermore, conventional systems often require manual review of applications and the information and documents associated therewith. As such, reviewers of such applications may be required to review copious amounts of information from various document and sources to make an informed decision regarding the application. Still further, conventional systems may lack the ability to verify information and documents received in association with the application are authentic and free from alteration and/or have not been fabricated. Thus, reviewers may be unable to verify whether the information and documents provided by the applicant is valid, up to date, or otherwise accurately reflects information associated with the applicant.

This application describes techniques for verifying information associated with an applicant (or other user) and providing a recommendation regarding approval of the application via a verification and decision system and/or service (herein referred to as an "verification service"). Various examples of the present disclosure include systems, methods, and non-transitory computer-readable media of a verification service.

For instance, in one example, a verification service may operate a service that corresponds to a dedicated application installed on a user device. The verification service may be associated with an entity (e.g., a landlord, creditor, employer, etc.) or with one or more users (e.g., an applicant). The verification service may enable the entity, or a user associated with the entity, to request information from an applicant (e.g., an applicant for employment, a loan, a rental agreement, etc.). The verification service may enable the applicant to provide information and/or access to information directly or via one or more third-party services (e.g., open banking system(s), credit check organizations, background check organizations, payroll providers, employers, etc.). The verification service may enable user to provide or access information via the application installed on the user device. In some cases, the information may be access (e.g., viewed) by devices associated with other users that are granted access to such information that also have the application installed on respective device. Additionally, or alternatively, the verification service may enable users to provide or access information via a web-based application accessed via a web browser. In some examples, the verification service may receive various requests and may be implemented in various situations via an application programming interface (API). The API may allow users to select which verification types to request. The API may also allow uses to select which types of information to share. The API may be used to provide various functions of the verification service described herein. The verification service may store account information associated with each user (e.g., applicant or users associated with an entity) and the respective device on which the application is installed and/or via which the verification service is accessed.

In some examples, the verification service receives an application from a user, such as an applicant, or receives a request to verify information associated with a user from an entity (e.g., landlord, creditor, employer, etc.). In response to receiving the application (or the request), the verification service may send a request to the user requesting access to information associated with the user. In some examples, the information may include at least one of financial information, identification information, employment information, background information, or other type of information. In some examples, the verification service allows an entity (or user associated therewith) to select one or more types and/or pieces of information/data to request from the user.

In some examples, the request for access to the information may include a prompt for the user to connect with a third-party service that may provide at least a portion of the information to the verification service. For example, the verification service may send a prompt to the applicant to authorize access to financial information by an open banking system, to authorize access to payroll data associated with an employer of the user, to authorize a background check to be conducted via a background check service, to authorize a credit check to be conducted via a credit check service, among other potential authorization for third-party services.

In some examples, once the user has authorized access to information associated with the user by one or more third-party services, the verification service may receive report(s) from the one or more third-party services with respective information and/or data from such services. For example, the verification service may receive financial data, payroll data, employment history, background information, etc.

In some examples, the verification service may also request information to be received directly from the user. For example, the verification service may request identification information associated with the user. In response, the user may upload image data associated with a government issued identification (e.g., driver's license, passport, etc.) or other piece of identification. Additionally, or alternatively, the user may be prompted to complete a form to provide identification information such as a date of birth (DOB), social security number (SSN) or other government identification number, current or past mailing or residency address(es), marital status, etc.

The verification service may verify information received directly from the user and from the third-party services. For example, the verification service may determine that a name of the user is consistent between the identification information received from the user and the financial information received from the open banking system. Additionally, or alternatively, the verification service may also confirm that information is consistent with respect to current or past address(es), personal identification number(s), employment history, financial account information, debt information, etc. As such, the verification service may cross-check information across various sources to determine whether such information is consistent or not and may determine whether to verify such information based on the consistencies or lack thereof.

Furthermore, the verification service may determine a score associated with the user based on the information provided by the user and received from the third-party service(s). For example, the verification service may determine an income score, an expense (or expenditure) score, and a composite score that is a sum of the income score and the expense score. In some examples, the verification service may determine fewer scores or more scores than the scores described previously. Furthermore, the verification service may determine one or more factors including financial factors, verification factors, or other factors associated with the information. The verification service may determine one or more weighting factors for the one or more factors and may determine the one or more scores based on the one or more factors and the one or more weighting factors. For example, if the verification service is unable to verify particular information associated with the user, the verification service may assign a lower weighting factor to such information in order to reduce the impact of unverified information on the score. Conversely, the verification service may weight verified information higher in order to increase the impact of verified information on the score.

Still further, the one or more weighting factors may represent a relative impact that individual factors have on income, expenditure, stability, and/or consistency of financial data associated with the user. In some examples, the one or more weighting factors may be set by an entity (or user associated therewith) or the one or more weighting factors may be determined by a machine learning model configured to determine the score associated with the user. The machine learning model may be trained by determining one or more financial factors and/or one or more weighting factors associated with financial data across a plurality of user over time. Furthermore, in some examples, the machine learning model may be configured to automatically recognize and/or identify income sources (such as payroll, government income, alternative income, etc.) by identifying patterns of credit deposits or other sources of alternative income that may not be included in conventional income statements or may not be easily recognized by a reviewer. As such, the verification service may identify all recurring income sources based at least in part on the financial data. Furthermore, in some examples, the verification service may weight the income sources based on the type of income, reliability of the income, or based on other factors, as described herein. Additionally, or alternatively, the verification service may recognize various sources of income and allow the reviewer to weight such sources of income.

In some examples, the verification service may compare the score (income, expense, or composite) to one or more thresholds. For example, the verification service may determine whether the score is equal to or greater than a first threshold. In some examples, if the score is equal to or greater than a first threshold, the verification service may automatically approve the user for an application associated with the user and may send the user an indication that they have been approved for their application and may send a reviewer (or entity associated with the application) an indication that the application has been automatically approved. However, if the score is less than a first threshold but equal to or greater than a second threshold, the verification service may generate a recommendation to approve the application and send the recommendation to a reviewer without automatically approving the application. Still further, if the score is less than the second threshold, the verification service may automatically deny the application and may send an indication that the application has been denied to the user and an indication that the application has been automatically denied to a reviewer.

It is to be understood that fewer or more thresholds may be implemented to determine whether to automatically approve or deny an application or to determine to require further review of an application. In some examples, one or more thresholds may be determined by an entity. However, in some examples, the verification service may receive one or more metrics and may automatically set the one or more thresholds based at least in part on the one or more metrics. For example, the verification service may receive a financial metric (e.g., top 25% income compared to general population receive automatic approval, within 10% of average income receive recommendation for approval but require review, etc.), an approval metric (e.g., 5% automatic approval rate, 50% review rate, etc.), or other metrics. Based at least in part on the one or more metrics, the verification service may determine one or more threshold scores by which to approve, deny, or provide a recommendation to a reviewer.

Furthermore, in some examples, once a user has provided access to their information, the user may be able to send their verified information along with financial report(s) and/or score(s) to other entities. The verification service may also allow the user to select which portion(s) of the information to be shared and a duration of time to share such information. As such, the verification service may allow a user to provide verified information and financial insight with multiple entities in a simple and secure solution without requiring the user to gather and provide such information each time the user submits an application or otherwise provides such information.

In some instances, the verification service may allow a user to send an indication that information has been verified and/or provide a financial report and/or score without requiring sensitive information to be sent to an entity. For example, once an identity of the user has been verified, the user may send an indication to an entity that the identity of the user has been verified, but may choose to restrict access to personal and/or or sensitive information associated with the user (such as a SSN, DOB, or other information). As such, the entity receives an indication that the identity of the user is verified, while such personal and/or sensitive information is kept private by the user. Similarly, the user may choose to share a score associated with financial information of the user while choosing to restrict access to financial data associated with income, expenses, or other financial data. As such, the entity may receive an indication from the verification service that the user has a score that satisfies one or more thresholds, while keeping at least portion of the financial data of the user private. It is to be understood that the user is provided with complete control over which information is shared and which information the user desires to keep private. The user may also have complete control over permissions associated with the information that is shared with the entity. Furthermore, the entity may be provided with various controls specifying which information the entity requires in order to be able to consider the user for an application. The entity may also may be provided with various controls specifying a length of time for which a unique verification session is valid.

In some examples, the verification service may troubleshoot issues that may occur with third-party services. For example, a user may connect with an open banking system that may retrieve financial data associated with the user and may send at least a portion of the financial data to the verification service. To connect with the open banking system, the open banking system may send a request to the user to access financial data associated with the user. In response to the request, the user may permit the open banking system to access at least a portion of the financial data. In some examples, the user may specify which portion(s) of the financial data that the open banking system may access.

Once the user approves, the user may be directed to a website or application associated with a banking entity associated with one or more accounts of the user. The user may be prompted to provide authentication data for an account associated with the banking entity. It is to be noted that the authentication data is not shared with the open banking system or the verification service. Once the user has provided their authentication data, the banking entity verifies an identity of the user and requests permission from the user to send the financial data to the open banking system. As mentioned previously, the user may specify which portion(s) of the financial data to send to allow the open banking system to access. Once the user has authorized access to at least a portion of the financial data, the user may be redirected to the verification service and the verification service may receive a report from the open banking system with the financial data or portion(s) thereof.

In some examples, when the user attempts to connect with an open banking system an issue may occur. For example, the user may provide incorrect authentication data associated with the banking entity. In some examples, providing incorrect authentication data may prevent a connection between the banking entity and the open banking system to be established. Furthermore, a connection may be established between the banking entity and the open banking system and the open banking system may retrieve the financial data. The open banking system may then provide a report to the verification service with the financial data (or portion(s) thereof). However, in some examples, the report may be incomplete and/or missing data required by the verification service. Furthermore, in some examples, attempts to resolve such issues described above may fail.

As such, the verification service may determine one or more alternate open banking systems to retrieve the financial data. For example, the verification service may receive an uptime value from the one or more alternate open banking systems. The uptime value may indicate at least one of a completion rate or a completion time associated with one or more connections established between the one or more alternate banking systems and one or more banking entities. In some examples, the uptime value may be associated with one or more connections between the one or more alternate banking systems and a banking entity associated with the user.

These and other aspects are described further below with reference to the accompanying drawings. The drawings are merely example implementations and should not be construed to limit the scope of the claims. For example, while examples are illustrated in the context of a user interface for a mobile device, the techniques may be implemented using any computing device and the user interface may be adapted to the size, shape, and configuration of the particular computing device.

Example System Architecture

FIG. 1 is a schematic view of an example computing system 100 usable to verify user information and provide a decision matrix for an application associated with the user via the system 100. In some examples, the system 100 may include users 102(1), 102(2), ... 102(n) (collectively "users 102") to interact using computing devices 104(1), 104(2), ... 104(m) (collectively "computing devices 104") with a verification service 106 via a network 108. In this example, n and m are non-zero integers greater than 1. In some examples, the users 102 may include a first user 102(1) such as an applicant and a second user 102(2) such as a reviewer or other individual associated with an entity to which the first user 102(1) submits an application or other information verification request.

Each of the computing devices 104 includes one or more processors and memory storing computer executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) and/or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 104 may access the verification service 106 and/or communicate with one another.

The verification service 106 may include one or more servers or other computing devices, any or all of which may include one or more processors and memory storing computer executable instructions to implement the functionality discussed herein attributable to the verification service 106 or digital platform. The verification service 106 may enable users 102 (such as persons or organizations) to interact with the verification service 106 and, in some cases, with each other via the computing devices 104. The verification service 106 may, with input from a user, create and store in the verification service 106 a user account associated with the user.

The verification service 106 may be configured to verify information associated with a user and/or to provide a recommendation and/or decision for an application associated with the user.

For example, at operation 110 (indicated by "1"), the verification service 106 may receive an application from a user account associated with the first user 102(1). In some examples, the operation 110 may include receiving a request to submit an application from the user account associated with the first user 102(1). In such an example, the verification service 106 may proceed to a next operation (e.g., operation 112) to request information from the first user 102(1) prior to the first user 102(1) submitting an application. As used herein, an application may refer to an application for a lease agreement (e.g., for a rental property, vehicle, etc.), a loan (e.g., a mortgage, vehicle, etc.), employment, or other type of contractual agreement between the first user 102(1) (e.g., an applicant) and a second user 102(2) (e.g., a reviewer) and/or an entity with which the second user 102(2) may be associated (e.g., an employee of the entity, an owner of the entity, etc.).

While FIG. 1 depicts the verification service 106 as receiving the application, in some examples, the second user 102(2) associated with the entity may receive the application and the application or a portion thereof may be provided to the verification service 102 by the second user 102(2). Additionally, or alternatively, the verification service 106 may receive the application and may provide the application or a portion thereof to the second user 102(2). Still further, one or more components (e.g., components 112-118) of the verification service 106 may receive the application. Furthermore, while FIG. 1 depicts arrows between the users 102, the verification service 106, and third-party services 122, it is to be understood that information and/or data associated therewith may be sent and/or received via the network(s) 108.

In some examples, the application may specify various types of information and/or data to request from the first user 102(1). For example, the application may indicate that income information is needed from the first user 102(1) in order for the application to be complete and/or considered. In such an example, the verification service 106 may prompt the user to provide such information and/or to grant access to such information absent input from the second user 102(2). Additionally, or alternatively, the second user 102 (2), upon receipt of the application, may send a request to the verification service 102 for various types of information to request from the first user 102(1). In either example, the second user 102(2) may indicate which information to request from the first user 102(1).

At operation 120 (indicated by "2"), the verification service 106 may send a request to the first user 102(1) for information associated with the first user 102(1). As mentioned previously, the verification service 106 may send a request automatically based at least in part on receiving an application (or a request to submit an application) from the first user 102(1). In such an example, a verification component 114 of the verification service 106 may receive the application or a request to submit an application and may determine information to request from the first user 102(1). For example, the verification component 114 may determine to request financial information, education information, identification information, employment information, or other types of information from the first user 102(1).

In some examples, the request for information from the first user 102(1) may include a request or prompt that may be presented to the first user 102(1) to grant access to the requested information by one or more third-party services 122. For example, the request may include a request for financial information associated with the first user 102(1). The request may include a prompt for the first user 102(1) to grant access to the financial information by a third-party service 122 such as an open banking system. Furthermore, the verification service 102 may send a prompt to the first user 102(1) to authorize access to financial information by an open banking system, to authorize access to payroll data associated with an employer of the first user 102(1), to authorize a background check to be conducted via a background check service, to authorize a credit check to be conducted via a credit check service, among other potential authorizations for one or more third-party services 122. In some examples, the prompt may allow the first user 102(1) to select a third-party service that the first user 102(1) already has an account associated therewith. For example, to access payroll data associated with an employer, the first user 102(1) may log into a payroll service and may grant access to portion(s) of payroll data by the verification service 106 via the payroll service.

At operation 124 (indicated by "3") the first user 102(1) may grant access to information associated with the first user 102(1) by one or more third-party services 122. As mentioned previously, the first user 102(1) may specify which information and/or data the third-party services 122 may access and provide to the verification service 106. For example, the first user 102(1) may permit an open banking system to access information and/or data related to an identity of the first user 102(1) (e.g., name, DOB, etc.), an income associated with the first user 102(1), expenses associated with the first user 102(1).

At operation 126 (indicated by "4") the verification service 106 may receive information associated with the first user 102(1). In some examples, the information may include information gathered (e.g., scraped) by one or more third-party services 122. The information gathered by the one or more third-party services includes information to which the first user 102(1) authorized access. For example, the information may include financial data scraped by an open banking system.

Furthermore, the information received at 126 may include information directly provided by the first user 102(1). Such information may include information that is included in an application, such as in a fillable form that the first user 102(1) completes. Such information may also include additional information that the first user 102(1) provides. For example, the first user 102(1) may be requested to provide identification information and may be prompted to provide a picture of a government-issued identification (or other personal identification). In response, the first user 102(1) may use their computing device 104(1) to capture image data associated with the government issued-identification and may provide the image data to the verification service 106.

At operation 128 (indicated by "5"), the verification component 114 may verify the information once the verification service 106 has received the information. The verification component 114 may analyze the information received from the one or more third-party services 122 and any information provided directly by the first user 102(1) to determine whether the information is consistent. For example, the verification component 114 may determine whether a name of the first user 102(1) is consistent based on image data associated with the government-issued identification and financial data that was received from the open banking system.

In some instances, when the verification component 114 determines that information and/or data is consistent, the verification component 114 may generate an indication that a portion of the information has been verified. However, if the verification component 114 determines that information and/or data is inconsistent, the verification component 114 may generate an indication that a portion of the information is unverified or requires further review or further information to verify the portion of the information. Furthermore, if the verification component 114 determines that information and/or data is missing or incomplete, the verification component 114 may generate an indication that the information and/or data is missing or incomplete and may send a request to the first user 102(1) and/or the third-party services 122 for additional information.

At operation 130 (indicated by "6"), a scoring component 116 may determine one or more scores associated with the first user 102(1). For example, the scoring component 116 may determine a verification score indicative of a certainty that information associated with the first user 102(1) and/or an identity of the first user 102(1) is accurate, up to date, or otherwise accurately identifies the first user 102(1). The scoring component 116 may also determine a financial score for the first user 102(1). The financial score may indicate a certainty that financial information and/or data associated with the first user 102(1) is verifiable. Furthermore, the financial score may include an income score indicating a reliability of an income associated with the first user 102(1). The financial score may also include an expense score indicating a financial impact of expenditure associated with the first user 102(1). The income score and the expense score may be combined to determine the financial score (or "composite score").

In some instances, the scoring component 116 may weight information and/or data different. For example, if the scoring component 116 receives information and/or data from a reputable third-party service, the scoring component 116 may place more weight on such information and/or data. However, the scoring component 116 may place less weight on information and/or data received directly from the first user 102(1), an unknown or irreputable third-party service, or another source.

Furthermore, the scoring component 116 may place more weight on financial data based at least in part on a length of history of the financial data, a consistency of income associated with the financial data, a consistency of expenditure associated with the financial data, etc. Conversely, the scoring component 116 may place less weight on financial data if income data is inconsistent, expenditure data is inconsistent, a length of history of the financial data is relatively short (e.g., less than a year, less than 6 months, etc.), etc. The scoring component 116 may also place more weight on debts, balance statements (both current and historical), non-sufficient funds (NSF) statements, etc.

In some examples, the scoring component 116 may leverage one or more machine learning models 118 of the application decision component 112 to determine factors individually, or in combination, that have the greatest impact on financial stability associated with the first user 102(1). The machine learning models 118 may determine and apply various weights to the factors individually, or in combination, based on a predicted impact on the financial stability of the factor(s) associated with the first user 102(1). For instance, the machine learning models 118 may use a feature reduction and/or feature selection algorithm to identify one or more factors that may impact the financial stability of the first user 102(1) the most and/or will impact the financial stability of the first user 102(1). Additionally, or alternatively, the scoring component 116 may input the financial data and/or the factor(s) into a deep neural network of the machine learning models 118, where the deep neural network is trained to determine an income score indicating a reliability of an income (which may include payroll, government income, passive income, etc.) associated with the first user 102(1), an expense score indicating a financial impact of the expenditure (which may include cashflow, utilities, debts, etc.) associated with the first user 102(1), a financial score indicating an overall financial stability of the first user 102(1), total average monthly income, payroll or total average monthly recurring income, among other factors.

At operation 132 (indicated by "7"), the application decision component 112 determines a recommendation for the application based at least in part on the score generated by the scoring component 116. In some examples, the application decision component 112 may compare the score (income, expense, and/or composite) to one or more thresholds. For example, the application decision component 112 may determine whether the score is equal to or greater than a first threshold. In some examples, if the score is equal to or greater than a first threshold, the application decision component 112 may automatically approve the first user 102(1) for an application associated with the first user 102(1). However, if the score is less than a first threshold but equal to or greater than a second threshold, the application decision component 112 may generate a recommendation to approve the application. Still further, if the score is less than the second threshold, the application decision component 112 may automatically deny the application.

It is to be understood that fewer or more thresholds may be implemented to determine whether to automatically approve or deny an application or to determine to require further review of an application. In some examples, one or more thresholds may be determined by the second user 102(2) and/or an entity associated with the application. However, in some examples, the application decision component 112 may receive one or more metrics and may automatically set the one or more thresholds based at least in part on the one or more metrics. For example, the application decision component 112 may receive a financial metric (e.g., top 25% income compared to general population receive automatic approval, within 10% of average income receive recommendation for approval but require review, etc.), an approval metric (e.g., 5% automatic approval rate, 50% review rate, etc.), or other metrics. Based at least in part on the one or more metrics, the application decision component 112 may determine one or more threshold scores by which to approve, deny, or provide a recommendation to a reviewer.

At operation 134 (indicated by "8"), the verification service 106 may provide any information, recommendation(s), and score(s) to the second user 102(2). In some examples, if the score determined to be equal to or greater than a first threshold, the verification service 106 may automatically approve the first user 102(1) for an application associated with the first user 102(1) and may send the first user 102(1) an indication that they have been approved for their application and may send the second user 102(2) (or entity associated with the application) an indication that the application has been automatically approved. However, if the score is less than a first threshold but equal to or greater than a second threshold, the verification service 106 may generate a recommendation to approve the application and send the recommendation to the second user 102(2) without automatically approving the application. Still further, if the score is less than the second threshold, the verification service 106 may automatically deny the application and may send an indication that the application has been denied to the first user 102(1) and an indication that the application has been automatically denied to the second user 102(2).

Figure 2:
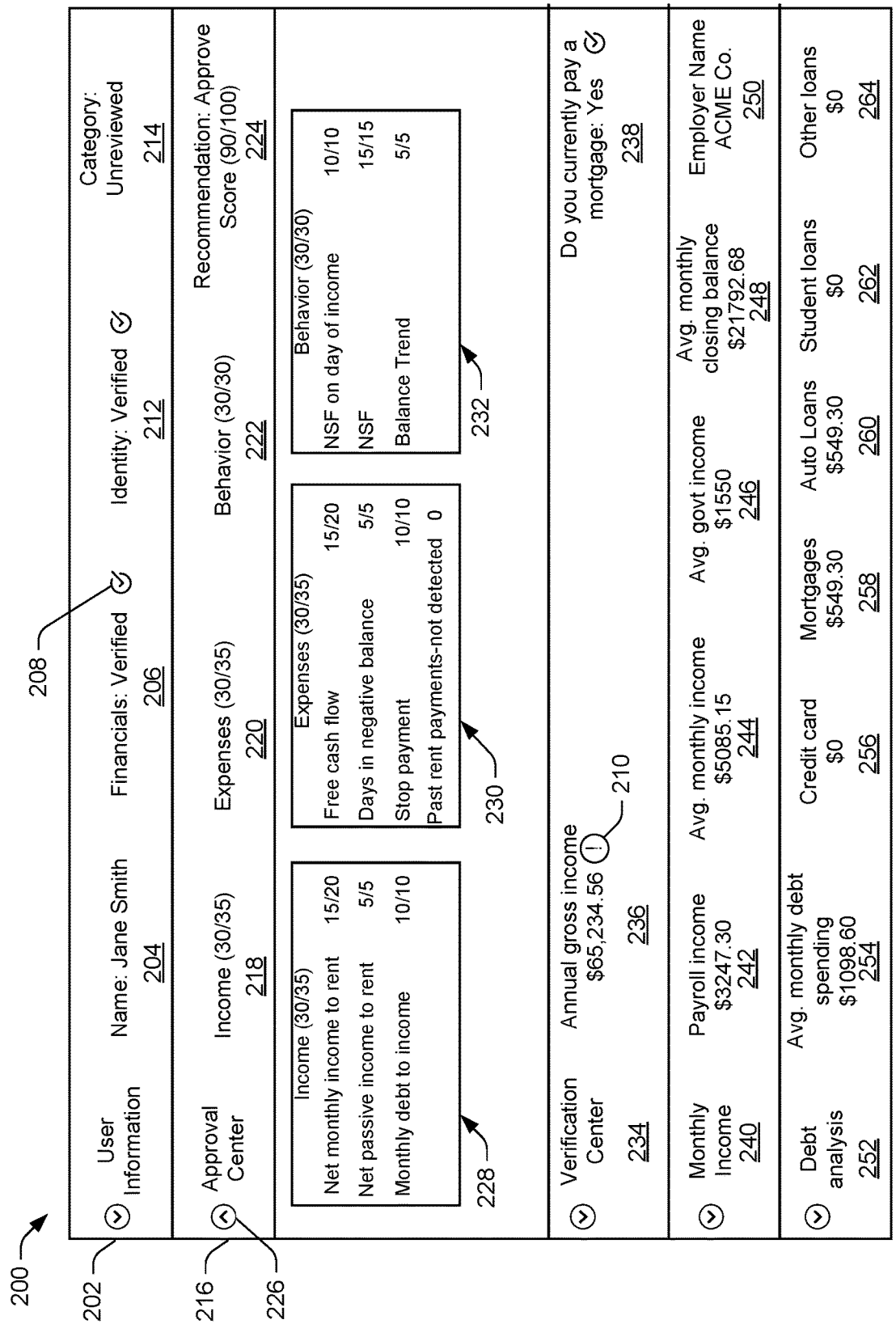
FIG. 2 depicts an example user interface that is usable to provide verified information as well as a decision matrix for deciding whether to approve an application, in accordance with an example of the present disclosure.

FIG. 2 depicts an example user interface 200 which may be displayed via any of the computing devices 104. The user interface 200 may be configured to provide verified information as well as a decision matrix for deciding whether to approve an application. The user interface 200 may include detailed information, data, and analysis that is gathered and determined from the information provided by the first user 102(1) and received from the third-party services 122. In some examples, the user interface 200 may be provided to the second user 102(2) to recommend or otherwise assist the second 102(2) to review an application associated with the first user 102(1). Furthermore, the user interface 200 may also be provided to the first user 102(1) to give the user detailed insight into their information and financial data.

In some examples, the user interface 200 may include user information 202 associated with the user 102(1). In some examples, the user information 202 may include a name 204 (e.g., "Jane Smith") of the user 102(1) or other identifying information associated with the user 102(1). In some examples, the user information 202 portion of the user interface 200 may also provide a summary of an application of the user 102(1). For example, the user interface 200 may provide an indication 206 indicating whether financial information associated with the user 102(1) has been verified. In some examples, when information associated with the user 102(1) has been verified, the user interface 200 may display the word "Verified" along with a verification icon 208 to indicate that such information has been verified. It is to be noted, that the verification icon 208 may be displayed in associated with any verified information that is provided via the user interface 200. In some examples, when the verification service 106 is unable to verify information associated with the user 102(1), the user interface 200 may display an icon 210 indicating that the information requires further review and/or that the information includes inconsistencies. It is to be noted, that the icon 210 may be displayed in associated with any unverified information that is provided via the user interface 200. The user interface 200 may also provide an indication 212 indicating whether the identity of the user 102(1) has been verified.

The indications 206 and 212 may provide a summary the status of such information and further detail may be provided regarding each category of information. The user interface 200 may also include an indication 214 of a category or status of the application. The indication 214 indicate whether the application is approved, denied, requires further review, unreviewed, reviewed, or combination thereof (e.g., approved but unreviewed).

The user interface 200 may also provide an approval summary 216 portion. The approval summary 216 may include an income score 218, an expense score 220, a behavior score 222, and/or a composite score 224 (or financial score). As described previously, the scoring component of the verification service may determine such scores. As shown in FIG. 2, each score may include an indication of the user's score out of a potential score. For example, with respect to the income score, the verification service 106 determined that the user 102(1) scored 30 out of 35 potential points for the income category. However, these values are merely provided as examples and the scores may include any real number value. In some examples, the composite score 224 may include a recommendation of whether to approve the application. The recommendation may be presented to the second user 102(2) and may indicate whether the verification service 106 recommends approving the application or denying the application. Furthermore, the recommendation may indicate whether the application has been automatically approved or denied.

In some examples, the user interface 200 may display one or more selectable controls 226 that, when selected, display additional information associated with a particular portion of the user interface 200 and the information associated therewith. For example, if a user 102 selects the selectable control 226 in the approval summary 216, the user interface 200 may display further information regarding the various calculated scores.

In some instances, the user interface 200 may display one or more income factors 228 determined by the scoring component. The one or more income factors 228 may be factors that impact an income and an income score of the user 102(1). In some examples, the scoring component may determine a score for each of factor. The scores of the individual factors may be added to determine the total score for a given category. In some examples, weighting the individual factors may include assigning a potential score to each of the factors. For example, a factor that is weighted heavier (e.g., net monthly income to rent with a potential score of 20) may be given a higher potential score than a factor that is weighted less (e.g., net passive income to rent with a potential score of 5). As mentioned previously, the weights may be assigned by the second user 102(2) or the weights may be set automatically by the verification service 106.

In some examples, the one or more income factors 228 may include various factors including, but not limited to, net monthly income to rent (or mortgage) (e.g., a comparison of net monthly income to a payment associated with the application such as a rental payment or mortgage payment), net passive income to rent, monthly debt payments to income, or other factors. Values of the one or more income factors 228 may be determined by the verification service and based at least in part on financial data and/or information received from an open banking system and/or from the user 102(1).

In some examples, the user interface 200 may display one or more expense factors 230. The one or more expense factors 230 may include factors that impact expenditure and an expense score of the user 102(1). Similar to the one or more income factors 228, the one or more expense factors 230 may be weighted and scored by the scoring component. The one or more expense factors 230 may include various factors including, but not limited to, free cash flow, balance trends, days in negative balance for accounts associated with the user, stop payment requests, past rent payments (if detected), weighted average of various expenses as a percentage of corresponding income score, among other expense factors. Values of the one or more expense factors 230 may be determined by the verification service and based at least in part on financial data and/or information received from an open banking system and/or from the user 102(1).

In some examples, the user interface 200 may display one or more behavior factors 232. The one or more behavior factors 232 may include factors that reflect a financial behavior of the user 102(1). Similar to the one or more income factors 228, the one or more behavior factors 232 may be weighted and scored by the scoring component. The one or more behavior factors 232 may include various factors including, but not limited to, non-sufficient funds (NSF) on day of income, any NSF instances, a balance trend for accounts associated with the user 102(1), among other behavior factors.

The user interface 200 may further provide a verification summary 234 indicating whether information associated with the user has been verified. The verification summary 234 may also display a summary of information that has been verified for various categories. For example, the verification summary 234 may include an income summary 236 representing an annual gross income associated with the user 102(1). As mentioned previously, the user interface 200 may display an icon 210 indicating that a category of information is unverified and/or unverifiable and may indicated to the second user 102(2) that such a category requires further review. The verification summary 234 may include an indication 238 of whether the user currently pays for a rental or mortgage.

In some examples, upon selection of the selectable control 226 associated with the verification summary 234, the user interface may display additional information associated with the user and may provide an indication of whether the information is verified. For example, the verification summary 234 may display further information including, but not limited to, a full legal name of the user, a current address of the user, previous address(es) of the user, a yearly income of the user, current bank balance(s) of the user, monthly expenses of the user, monthly debt payments of the user, average monthly balance(s) of accounts associated with the user, among other potential information.

The user interface 200 may further provide a monthly income summary 240. The monthly income summary 240 may provide a summary of various categories of income associated with the user 102(1). For example, the monthly income summary 240 may include a payroll income category 242 which represents monthly income that the user 102(1) receives from a payroll associated with an employer. The monthly income summary 240 may also include an average monthly income category 244 which represents an average monthly income associated with the user 102(1). The monthly income summary 240 may also include an average government income category 246 which may represent an amount of income that the user 102(1) receives from the government. In some example, the government income category 246 may be included along with or replaced by an average passive income category which may represent an amount of income that the user 102(1) received from investments, properties, or other passive (or near passive) means.

The monthly income summary 240 may also include an average monthly closing balance 248 category which represents a closing balance of one or more accounts at an end of each data and divides the closing balance by a number of calendar days in a given month. The average monthly closing balance may be used to assess the user's income stability. In some examples, the average monthly closing balance may be calculated for individual accounts of the user or for accounts as a composite score. The monthly income summary 240 may also include a name 250 of an employer (e.g., ACME Co.) of the user 102(1). In some examples, upon selection of the selectable control 226 associated with the monthly income summary 240, the user interface 200 may display additional information associated with the monthly income of the user, provide graphics associated with the monthly income of the user, or other information and/or data.

The user interface 200 may further provide a debt analysis summary 252. The debt analysis summary 252 may provide a summary of various categories of debt associated with the user 102(1). For example, the debt analysis summary 252 may include an average monthly debt spending category 254 which represent an average monthly amount that the user 102(1) spends to pay various debts. The debt analysis summary 252 may also include a credit card debt category 256, mortgage(s) category 258, auto loans category 260, student loans 262 category, or other loans 264 category.

In some examples, upon selection of the selectable control 226 associated with the debt analysis summary 252, the user interface 200 may display additional information associated with debt of the user 102(1). For example, and with respect to the credit card category 256, the user interface 200 may display information such as a number of credit cards associated with the user, average payment amounts for the credit cards, an average monthly balance for the credit card. With respect to the mortgage(s) category 258, the user interface

200 may display information such as a number of mortgage (s) associated with the user, an average monthly payment amount, a number of missed payments within a predetermined time period, etc. Similar information may be determined and displayed via the user interface for other categories of the debt analysis summary 252.

Figure 3:
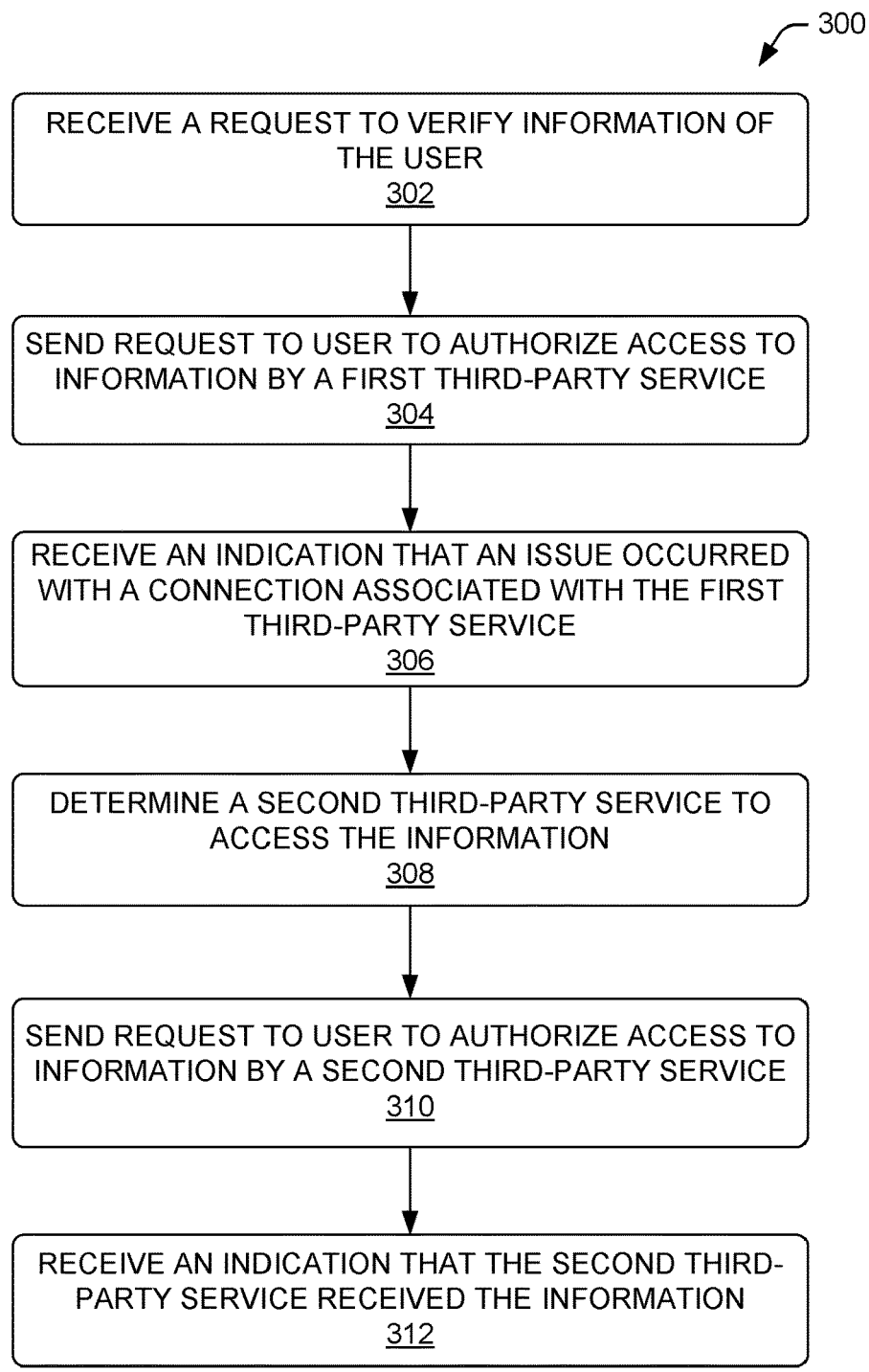
FIG. 3 illustrates a flowchart outlining an example method for troubleshooting a connection to a third-party service, in accordance with an example of the present disclosure.
Figure 4:
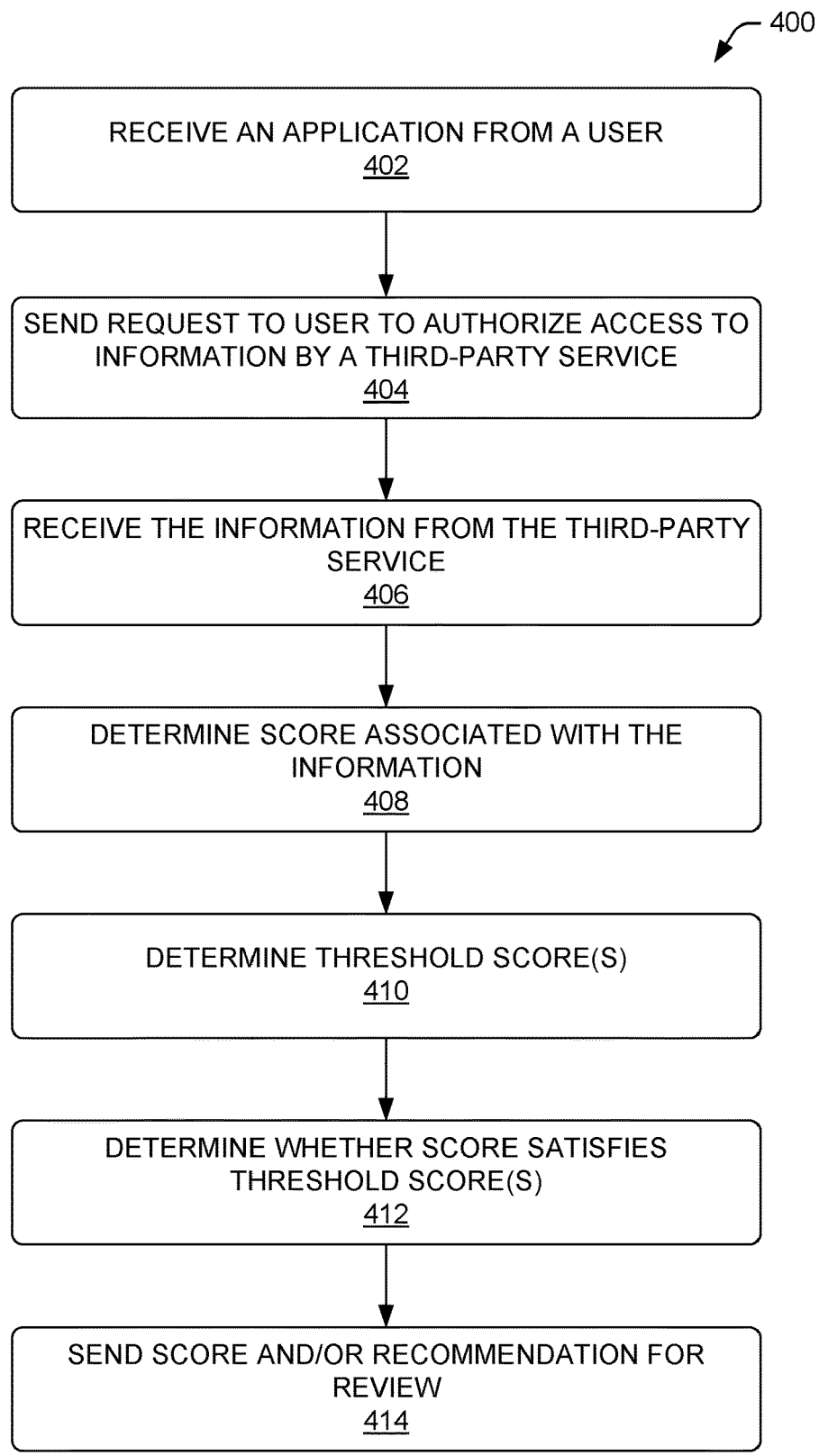
FIG. 4 illustrates a flowchart outlining an example method for determining a recommendation for an application submitted by a user, in accordance with an example of the present disclosure.
Figure 5:
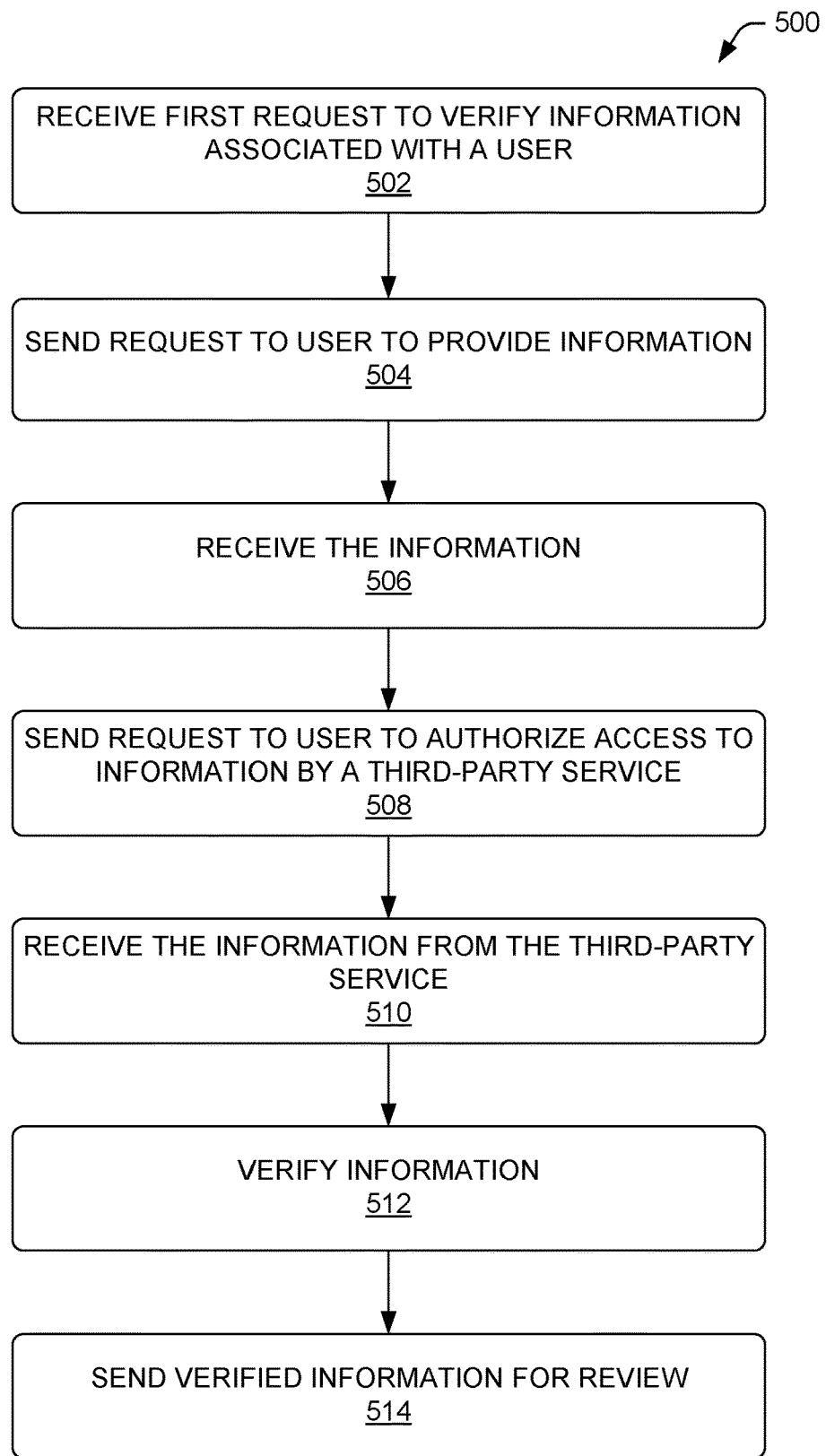
FIG. 5 illustrates a flowchart outlining an example method for allowing a reviewer of an application to select information to receive from an applicant and allowing the applicant to select which information is shared, in accordance with an example of the present disclosure.

FIGS. 3-5 illustrate example processes for verifying information and providing a recommendation with respect to an application. Various methods are described with reference to the example system of FIG. 1 and/or the user interface of FIG. 2 for convenience and ease of understanding. However, the methods described are not limited to being performed using the systems of FIG. 1 or FIG. 6 and/or the user interface of FIG. 2, and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the methods may be omitted entirely. Moreover, the methods described herein can be combined in whole or in part with one another, and/or with other methods.

FIG. 3 illustrates a flowchart outlining an example method for troubleshooting a connection to a third-party service.

At operation 302, the verification service may receive a request to verify information associated with a user. In some examples, the verification service may receive the request from the second user 102(2) and/or may receive the request from the first user 102(1). In some examples, the request may be received based at least in part on a user submitting an application or the request may be received independent from an application (e.g., prior to an application being submitted or to verify information associated with the user who is not associated with an application). In some instances, the request to verify information may include an indication of types of information to be verified. For example, the information to be verified may include financial information, identification information, background information, employment information, education information, or other types of information.

At operation 304, the verification service may send a request to the user to authorize access to the information by a first third-party service. In some examples, the first third-party service may be specified in the request, or the request may allow the user to select which third-party service to receive access to the information. Furthermore, in some examples, the first third-party service may be selected based on the type or types of information to be verified. For example, if the request to verify information at 302 includes a request to verify financial information, the request at 304 may include a request for the user to authorize access to the information by an open banking system (or platform).

In some examples, a user may connect with an open banking system that may retrieve financial data associated with the user and may send at least a portion of the financial data to the verification service. To connect with the open banking system, the open banking system may send a request to the user to access financial data associated with the user. In response to the request, the user may permit the open banking system to access at least a portion of the financial data. In some examples, the user may specify which portion(s) of the financial data that the open banking system may access.

Once the user approves, the user may be directed to a website or application associated with a banking entity associated with one or more accounts of the user. The user may be prompted to provide authentication data for an account associated with the banking entity. It is to be noted that the authentication data is not shared with the open banking system or the verification service. Once the user has provided their authentication data, the banking entity verifies an identity of the user and requests permission from the user to send the financial data to the open banking system. As mentioned previously, the user may specify which portion(s) of the financial data to send to allow the open banking system to access. Once the user has authorized access to at least a portion of the financial data, the user may be redirected to the verification service and the verification service may receive a report from the open banking system with the financial data or portion(s) thereof.

At operation 306, the verification service may receive an indication that an issue occurred with a connection associated with the third-party service. In some examples, the verification service may receive the indication from the user or from the third-party service. For example, the user may provide incorrect authentication data associated with the banking entity. In some examples, providing incorrect authentication data may prevent a connection between the banking entity and the open banking system to be established. Furthermore, a connection may be established between the banking entity and the open banking system and the open banking system may retrieve the financial data. The open banking system may then provide a report to the verification service with the financial data (or portion(s) thereof). However, in some examples, the report may be incomplete and/or missing data required by the verification service. Furthermore, in some examples, attempts to resolve such issues described above may fail.

At operation 308, the verification service may determine a second third-party service to access the information. For example, the verification service may determine one or more alternate open banking systems to retrieve the financial data. In some instances, the verification service may receive an uptime value from the one or more alternate open banking systems. The uptime value may indicate at least one of a completion rate or a completion time associated with one or more connections established between the one or more alternate banking systems and one or more banking entities. In some examples, the uptime value may be associated with one or more connections between the one or more alternate banking systems and a banking entity associated with the user. In some examples, the verification service may determine a threshold uptime value and may determine that an uptime value associated with the second open banking system is equal to or greater than the threshold uptime value.

Furthermore, determining the second third-party service may include generating a training data set for a machine learning algorithm. In some examples, the training data set including one or more first factors associated with one or more connections between the banking entity and one or more open banking platforms. The one or more first factors may include weighting factors representing a relative impact that individual factors have on the one or more connections.

In some examples, the machine learning algorithms may be trained using the training data set and the machine learning model may be configured to determine a confidence score indicating that an individual open banking system is able to connect with the banking entity.

Furthermore, the verification service may determine one or more factors associated with the second open banking system such as a region associated with the connection, the banking entity, or the user, connection times and/or connection rates associated with the second open banking system, the banking entity, or the user, among other factors. The verification service may determine a confidence score for the second open banking system using the machine learning model based at least in part on the one or more factors associated with the second open banking system. The verification service may also determine that the confidence score satisfies a threshold confidence score.

At operation 310, the verification service may send a request to the user to authorize access to the information by the second third-party service. In some examples, the second third-party service is specified in the request.

At 312, the verification service may receive an indication that the second-third-party service received the information associated with the user. For example, an open banking system may send a report to the verification service that the open banking system established a connection with one or more banking entities associated with the user and may provide the requested financial data and/or financial information. In some examples, the verification service may verify the financial data received from the open banking system. For example, the verification service may verify income, expenses, or other information and/or data associated with the user.

FIG. 4 illustrates a flowchart outlining an example method 400 for determining a recommendation for an application submitted by the user.

At operation 402, the verification service receives an application from the user. The application may be for a lease agreement (such as for a rental property, vehicle, or other lease agreement), a loan (such as for a mortgage, vehicle, or other loan), employment, or other type of contractual agreement.

At operation 404, the verification service may send a request to the user to authorize access to the information by a third-party service. In some examples, the third-party service may be specified in the request, or the request may allow the user to select which third-party service to receive access to the information. Furthermore, in some examples, the third-party service may be selected based on the type or types of information to be verified. For example, if the application specifies additional information that is needed or is missing information, the request at 404 may include a request for the user to authorize access to the information by a specific third-party service.

In some examples, a user may connect with an open banking system that may retrieve financial data associated with the user and may send at least a portion of the financial data to the verification service. To connect with the open banking system, the open banking system may send a request to the user to access financial data associated with the user. In response to the request, the user may permit the open banking system to access at least a portion of the financial data. In some examples, the user may specify which portion(s) of the financial data that the open banking system may access.

Once the user approves, the user may be directed to a website or application associated with a banking entity associated with one or more accounts of the user. The user may be prompted to provide authentication data for an account associated with the banking entity. It is noted that the authentication data is not shared with the open banking system or the verification service. Once the user has provided their authentication data, the banking entity verifies an identity of the user and requests permission from the user to send the financial data to the open banking system. As mentioned previously, the user may specify which portion(s) of the financial data to send to allow the open banking system to access. Once the user has authorized access to at least a portion of the financial data, the user may be redirected to the verification service and the verification service may receive a report from the open banking system with the financial data or portion(s) thereof.

At operation 406, the verification service may receive the information from the third-party servicer. For example, an open banking system may send a report to the verification service that the open banking system established a connection with one or more banking entities associated with the user and may provide the requested financial data and/or financial information. In some examples, the verification service may verify the financial data received from the open banking system. For example, the verification service may verify income, expenses, or other information and/or data associated with the user.

At 408, the scoring component of the verification service may determine a score associated with the information. For example, the scoring component may determine a verification score indicative of a certainty that information associated with the first user and/or an identity of the first user is accurate, up to date, or otherwise accurately identifies the first user. The scoring component may also determine a financial score for the first user. The financial score may indicate a certainty that financial information and/or data associated with the first user is verifiable. Furthermore, the financial score may include an income score indicating a reliability of an income associated with the first user. The financial score may also include an expense score indicating a financial impact of expenditure associated with the first user. The income score and the expense score may be combined to determine the financial score (or "composite score").

In some instances, the scoring component may weight information and/or data different. For example, if the scoring component receives information and/or data from a reputable third-party service, the scoring component may place more weight on such information and/or data. However, the scoring component may place less weight on information and/or data received directly from the first user, an unknown or irreputable third-party service, or another source.

Furthermore, the scoring component may place more weight on financial data based at least in part on a length of history of the financial data, a consistency of income associated with the financial data, a consistency of expenditure associated with the financial data, etc. Conversely, the scoring component may place less weight on financial data if income data is inconsistent, expenditure data is inconsistent, a length of history of the financial data is relatively short (e.g., less than a year, less than 6 months, etc.), etc. The scoring component may also place more weight on debts, balance statements (both current and historical), non-sufficient funds (NSF) statements, etc.

In some examples, the scoring component may leverage one or more machine learning models of the application decision component to determine factors individually, or in combination, that have the greatest impact on financial stability associated with the first user. The machine learning models may determine and apply various weights to the factors individually, or in combination, based on a predicted impact on the financial stability of the factor(s) associated with the first user. For instance, the machine learning models may use a feature reduction and/or feature selection algorithm to identify one or more factors that may impact the financial stability of the first user the most and/or will impact the financial stability of the first user.

Additionally, or alternatively, the scoring component may input the financial data and/or the factor(s) into a deep neural network of the machine learning models, where the deep neural network is trained to determine an income score indicating a reliability of an income (which may include payroll, government income, passive income, etc.) associated with the first user, an expense score indicating a financial impact of the expenditure (which may include cashflow, utilities, debts, etc.) associated with the first user, and/or a financial score indicating an overall financial stability of the first user.

At operation 410, the verification service may determine one or more threshold scores. The threshold score(s) may be implemented to determine whether to automatically approve or deny an application or to determine to require further review of an application. In some examples, one or more thresholds may be determined by an entity. However, in some examples, the verification service may receive one or more metrics and may automatically set the one or more thresholds based at least in part on the one or more metrics. For example, the verification service may receive a financial metric (e.g., top 25% income compared to general population receive automatic approval, within 10% of average income receive recommendation for approval but require review, etc.), an approval metric (e.g., 5% automatic approval rate, 50% review rate, etc.), or other metrics. Based at least in part on the one or more metrics, the verification service may determine one or more threshold scores by which to approve, deny, or provide a recommendation to a reviewer.

At operation 412, the verification service may determine whether the score satisfies one or more threshold scores. For example, the verification service may compare the score (income, expense, or composite) to one or more thresholds. For example, the verification service may determine whether the score is equal to or greater than a first threshold. In some examples, if the score is equal to or greater than a first threshold, the verification service may automatically approve the user for an application associated with the user and may send the user an indication that they have been approved for their application and may send a reviewer (or entity associated with the application) an indication that the application has been automatically approved. However, if the score is less than a first threshold but equal to or greater than a second threshold, the verification service may generate a recommendation to approve the application and send the recommendation to a reviewer without automatically approving the application. Still further, if the score is less than the second threshold, the verification service may automatically deny the application and may send an indication that the application has been denied to the user and an indication that the application has been automatically denied to a reviewer.

At operation 414, the verification service may send any information, recommendation(s), and score(s) for review. For example, the verification service may send information, recommendation(s), and score(s) to a second user (such as a reviewer) associated with an entity to which a first user submits the application. In some examples, if the score determined to be equal to or greater than a first threshold, the verification service may automatically approve the first user for an application associated with the first user and may send the an indication that they have been approved for their application and may send the second user (or entity associated with the application) an indication that the application has been automatically approved. However, if the score is less than a first threshold but equal to or greater than a second threshold, the verification service may generate a recommendation to approve the application and send the recommendation to the second user without automatically approving the application. Still further, if the score is less than the second threshold, the verification service may automatically deny the application and may send an indication that the application has been denied to the first user and an indication that the application has been automatically denied to the second user. In some examples, upon sending the information, recommendation(s), and score(s) for review, the verification service may receive an indication that the second user has reviewed the application and made a decision regarding the application. The verification service may send the indication to the first user including the decision for the application.

FIG. 5 illustrates a flowchart outlining an example method 500 for allowing a reviewer of an application to select information to receive from an applicant and allowing the applicant to select which information is shared.

At operation 502, the verification service may receive a request to verify information associated with a user. The request may be generated by a second user (such as a reviewer) and may specify information that the second user wants verified. For example, such information may include financial information, identification information, employment information, background information, education information, or other type of information. In some examples, the verification service allows the second user to select one or more types and/or pieces of information/data to request from the first user.

At operation 504, the verification service may send a request to a user to provide the information. For example, the verification service may send a request to the first user to provide the information specified by the second user. In some examples, at operation 504, the verification service may request that the first user provide information directly to the verification service. For example, the verification service may request identification information associated with the user. In response, the user may upload image data associated with a government issued identification (e.g., driver's license, passport, etc.) or other piece of identification. Additionally, or alternatively, the user may be prompted to complete a form to provide identification information such as a date of birth (DOB), social security number (SSN) or other government identification number, current or past mailing or residency address(es), marital status, etc.

At operation 506, the verification service receives the information that the first user provided directly to the verification service.

At 508, the verification service may send a request to the user to authorize access to the information by a third-party service. In some examples, the third-party service may be specified in the request, or the request may allow the user to select which third-party service to receive access to the information. Furthermore, in some examples, the third-party service may be selected based on the type or types of information to be verified. For example, if the application specifies additional information that is needed or is missing information, the request at 404 may include a request for the user to authorize access to the information by a specific third-party service.

In some examples, a user may connect with an open banking system that may retrieve financial data associated with the user and may send at least a portion of the financial data to the verification service. To connect with the open banking system, the open banking system may send a request to the user to access financial data associated with the user. In response to the request, the user may permit the open banking system to access at least a portion of the financial data. In some examples, the user may specify which portion(s) of the financial data that the open banking system may access.

Once the user approves, the user may be directed to a website or application associated with a banking entity associated with one or more accounts of the user. The user may be prompted to provide authentication data for an account associated with the banking entity. It is noted that the authentication data is not shared with the open banking system or the verification service. Once the user has provided their authentication data, the banking entity verifies an identity of the user and requests permission from the user to send the financial data to the open banking system. As mentioned previously, the user may specify which portion(s) of the financial data to send to allow the open banking system to access. Once the user has authorized access to at least a portion of the financial data, the user may be redirected to the verification service and the verification service may receive a report from the open banking system with the financial data or portion(s) thereof.

At operation 510, the verification service may receive the information from the third-party servicer. For example, an open banking system may send a report to the verification service that the open banking system established a connection with one or more banking entities associated with the user and may provide the requested financial data and/or financial information. In some examples, the verification service may verify the financial data received from the open banking system. For example, the verification service may verify income, expenses, or other information and/or data associated with the user.

At operation 512, the verification service may verify information received directly from the user and from the third-party services. For example, the verification service may determine that a name of the user is consistent between the identification information received from the user and the financial information received from the open banking system. Additionally, or alternatively, the verification service may also confirm that information is consistent with respect to current or past address(es), personal identification number(s), employment history, financial account information, debt information, etc. As such, the verification service may cross-check information across various sources to determine whether such information is consistent or not and may determine whether to verify such information based on the consistencies or lack thereof.

At 514, the verification service may send the verified information for review. For example, may send the information to the second user and may provide indications of which portions of the information have been verified and which portions may remain unverified.

Example System and Device

Figure 6:
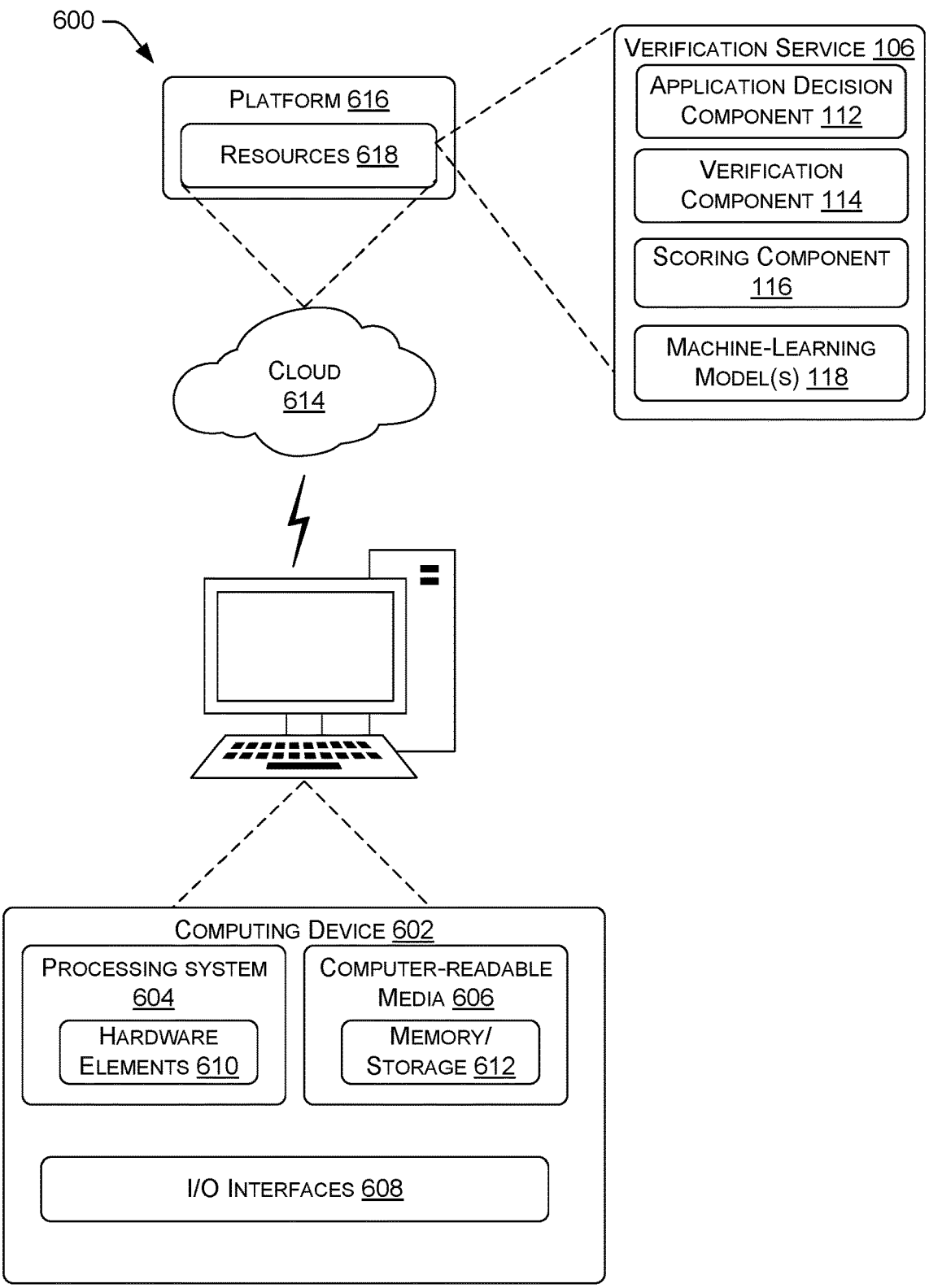
FIG. 6 is an example system and device that is usable to implement the techniques described herein.

FIG. 6 illustrates an example system generally at 600 that includes an example computing device 602 that is representative of one or more computing systems and/or devices that may implement the various techniques described herein. This is illustrated through inclusion of the verification system 106, the application decision component 112, the verification component 114, and the scoring component 116. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including a memory/storage component 612. The memory/storage component 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 602. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 602, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 610 and computer-readable media 606 are representative of modules, programmable device logic and/or device logic implemented in a hardware form that may be employed in some examples to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also be scalable to provide a corresponding level of scale to encountered demand for the resources 618 that are implemented via the platform 616. Accordingly, in an interconnected device example, implementation of functionality described herein may be distributed throughout multiple devices of the system 600. For example, the functionality may be implemented in part on the computing device 602 as well as via the platform 616 which may represent a cloud computing environment, such as the cloud 614.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:
receiving, by a verification service, a request from a user to verify financial data associated with the user;

sending, by the verification service and to the user, a first prompt to authorize access to the financial data by a first open banking platform;

receiving, by the verification service and from a first open banking system, a first indication that an issue occurred with a connection between the first open banking system and a banking entity associated with the financial data;

determining, by the verification service and a machine-learning component of the verification service configured to evaluate one or more factors associated with an ability of an individual open banking system to connect to the banking entity, a second open banking platform to receive access to the financial data;

receiving, by the verification service and from the second open banking platform, an uptime value associated with a second open banking system;

determining, by the verification service, that the uptime value is equal to or greater than a threshold uptime value;

sending, by the verification service and to the user, and based at least in part on determining that the uptime value is equal to or greater than the threshold uptime value, a second prompt to authorize access to the financial data by the second open banking platform; and receiving, by the verification service and from the second open banking system, a second indication that the second open banking system established a connection with the banking entity, wherein the connection enables the second open banking system to retrieve the financial data instead of the first open banking system.

2. The method of claim 1, wherein the uptime value indicates at least one of a completion rate or a completion time associated with one or more connections established between the second open banking system and one or more banking entities.

3. The method of claim 1, further comprising:
generating a training data set for a machine learning algorithm, the training data set including one or more first factors associated with one or more connections between the banking entity and one or more open banking platforms, wherein the one or more first factors include weighting factors representing a relative impact that individual factors have on the one or more connections; and training a machine learning model using the training data set, the machine learning model configured to determine a confidence score indicating that the individual open banking system is able to connect with the banking entity.

4. The method of claim 3, further comprising:
determining one or more second factors associated with the second open banking system;
determining a confidence score for the second open banking system using the machine learning model based at least in part on the one or more second factors; and
determining that the confidence score satisfies a threshold confidence score, wherein the verification service sends the second prompt to the user based at least in part on determining that the confidence score satisfies the threshold confidence score.

5. The method of claim 1, wherein first indication indicates that the issue is a connection issue indicating that the first open banking system was unable to establish a connection to the banking entity.

6. The method of claim 1, wherein the first indication indicates that the financial data received by the first open banking system is missing information.

7. The method of claim 1, further comprising:
receiving, from the second open banking system, the financial data associated with the user; and
verifying, by the verification service and based at least in part on the financial data, an identity of the user.

8. The method of claim 1, further comprising:
receiving, from the second open banking system, the financial data associated with the user; and
verifying, by the verification service and based at least in part on the financial data, an income associated with the user.

9. A system comprising:
one or more processors; and
one or more computer-readable media storing instructions that, when executed by the one or more processors, cause the one or more processors to perform operations comprising:
receiving, by a verification service and from a user device, a request to verify financial data associated with a user;
sending, by the verification service and to the user device, a first prompt to authorize access to the financial data by a first open banking platform;
receiving, by the verification service and from a first open banking system, a first indication that an issue occurred with a connection between the first open banking system and a banking entity associated with the financial data;
determining, by the verification service and a machine-learning component of the verification service configured to evaluate one or more factors associated with an ability of an individual open banking system to connect to the banking entity, a second open banking platform to receive access to the financial data;
receiving, by the verification service and from the second open banking platform, an uptime value associated with a second open banking system;
determining, by the verification service, that the uptime value is equal to or greater than a threshold uptime value;
sending, by the verification service and to the user, and based at least in part on determining that the uptime value is equal to or greater than the threshold uptime value, a second prompt to authorize access to the financial data by the second open banking platform; and
receiving, by the verification service and from the second open banking system, a second indication that the second open banking system established a connection with the banking entity, wherein the connection enables the second open banking system to retrieve the financial data instead of the first open banking system.

10. The system of claim 9,
wherein the uptime value indicates at least one of a completion rate or a completion time associated with one or more connections established between the second open banking system and one or more banking entities.

11. The system of claim 9, the operations further comprising:
generating a training data set for a machine learning algorithm, the training data set including one or more first factors associated with one or more connections between the banking entity and one or more open banking platforms, wherein the one or more first factors include weighting factors representing a relative impact that individual factors have on the one or more connections; and training a machine learning model using the training data set, the machine learning model configured to determine a confidence score indicating that the individual open banking system is able to connect with the banking entity.

12. The system of claim 11, the operations further comprising:

accessing one or more second factors associated with the second open banking system;

determining a confidence score for the second open banking system using the machine learning model based at least in part on the one or more second factors; and determining that the confidence score satisfies a threshold confidence score, wherein the verification service sends the second prompt to the user based at least in part on determining that the confidence score satisfies the threshold confidence score.

13. The system of claim 9, the operations further comprising:

receiving, from the second open banking system, the financial data associated with the user;

verifying, by the verification service and based at least in part on the financial data, an identity of the user; and verifying, by the verification service and based at least in part on the financial data, an income associated with the user.

14. The system of claim 9, wherein the first indication indicates that:

the issue is a connection issue indicating that the first open banking system was unable to establish a connection to the banking entity, or the financial data received by the first open banking system is missing information.

15. A non-transitory computer-readable medium having instructions stored thereon that, when executed by one or more processors, cause the one or more processors to perform operations comprising:

receiving, by a verification service, a request from a user to verify financial data associated with the user;

sending, by the verification service and to the user, a first prompt to authorize access to the financial data by a first open banking platform;

receiving, by the verification service and from a first open banking system, a first indication that an issue occurred with a connection between the first open banking system and a banking entity associated with the financial data;

determining, by the verification service and a machine-learning component of the verification service configured to evaluate one or more factors associated with an ability of an individual open banking system to connect to the banking entity, a second open banking platform to receive access to the financial data;

receiving, by the verification service and from the second open banking platform, an uptime value associated with a second open banking system;

determining, by the verification service, that the uptime value is equal to or greater than a threshold uptime value;

sending, by the verification service and to the user, and based at least in part on determining that the uptime value is equal to or greater than the threshold uptime value, a second prompt to authorize access to the financial data by the second open banking platform; and receiving, by the verification service and from the second open banking system, a second indication that the second open banking system established a connection with the banking entity, wherein the connection enables the second open banking system to retrieve the financial data instead of the first open banking system.

16. The non-transitory computer-readable medium of claim 15, wherein the uptime value indicates at least one of a completion rate or a completion time associated with one or more connections established between the second open banking system and one or more banking entities.

17. The non-transitory computer-readable medium of claim 15, the operations further comprising:

generating a training data set for a machine learning algorithm, the training data set including one or more first factors associated with one or more connections between the banking entity and one or more open banking platforms, wherein the one or more first factors include weighting factors representing a relative impact that individual factors have on the one or more connections; and training a machine learning model using the training data set, the machine learning model configured to determine a confidence score indicating that the individual open banking system is able to connect with the banking entity.

18. The non-transitory computer-readable medium of claim 17, the operations further comprising:

accessing one or more second factors associated with the second open banking system;

determining a confidence score for the second open banking system using the machine learning model based at least in part on the one or more second factors; and determining that the confidence score satisfies a threshold confidence score, wherein the verification service sends the second prompt to the user based at least in part on determining that the confidence score satisfies the threshold confidence score.

19. The non-transitory computer-readable medium of claim 15, the operations further comprising:

receiving, from the second open banking system, the financial data associated with the user;

verifying, by the verification service and based at least in part on the financial data, an identity of the user; and verifying, by the verification service and based at least in part on the financial data, an income associated with the user.

20. The method of claim 4, wherein the one or more second factors associated with the second open banking system include:

a region associated with one or more connections established between the second open banking system and one or more banking entities;

a region associated with the user;
a connection time associated with the one or more connections established between the second open banking system and the one or more banking entities; or
a connection time associated with the user.

\* \* \* \* \*